Feb. 23, 1937.    A. J. DIESCHER    2,071,969
COMBINATION STOP AND CHECK VALVE
Filed May 28, 1934    3 Sheets-Sheet 1
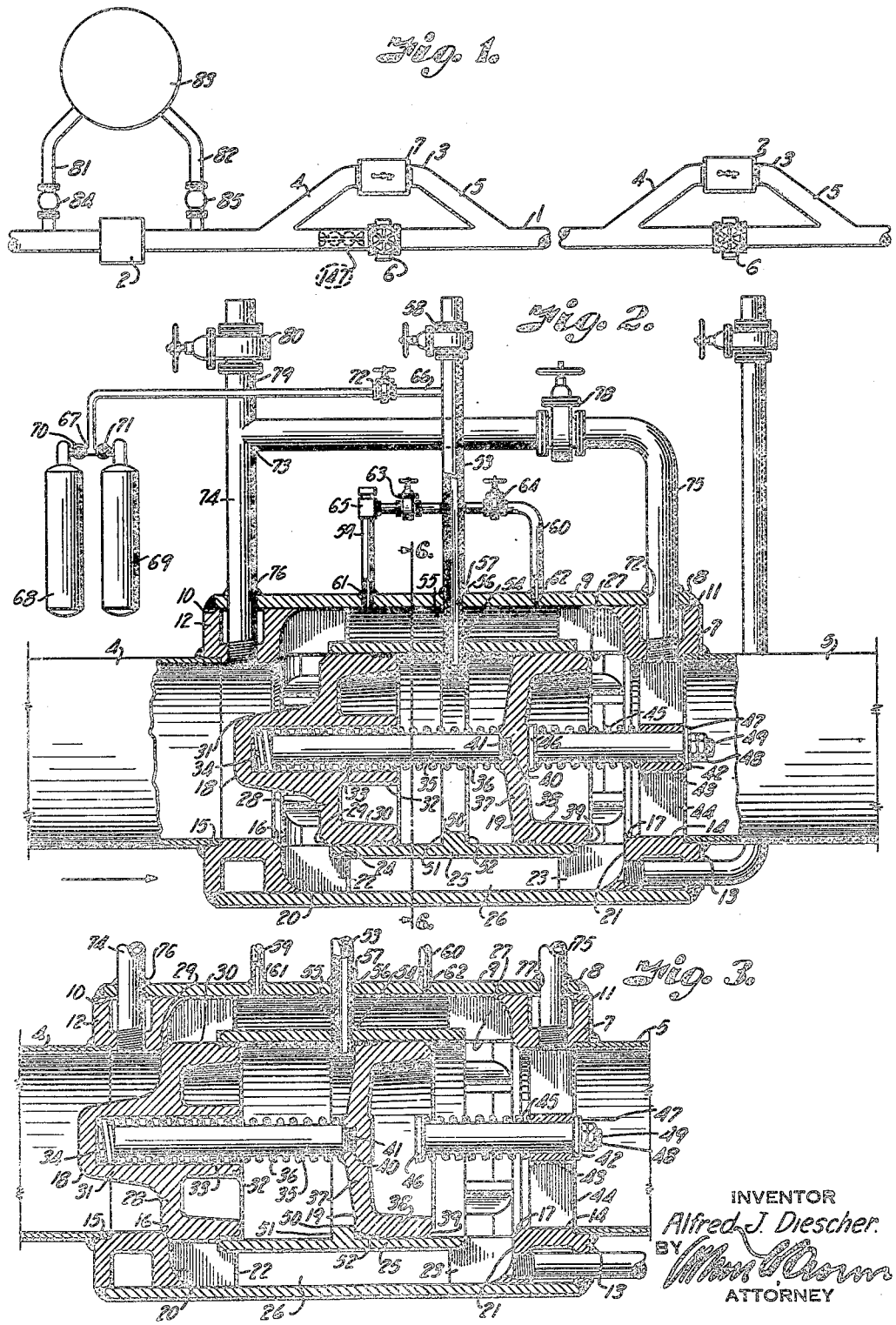
INVENTOR
Alfred J. Diescher.
BY
ATTORNEY

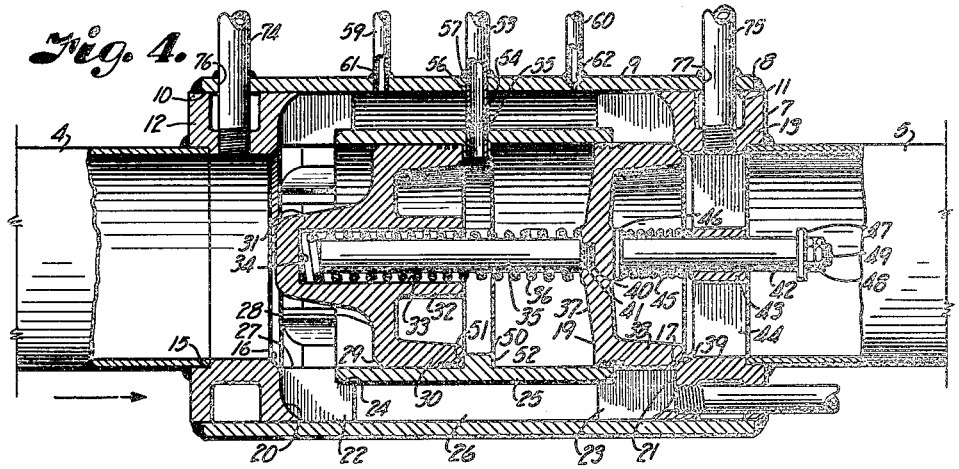
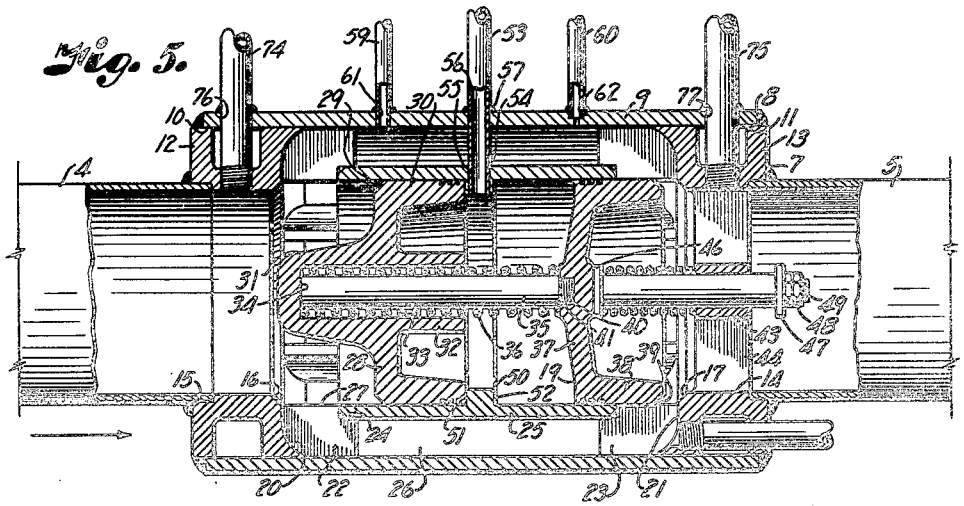
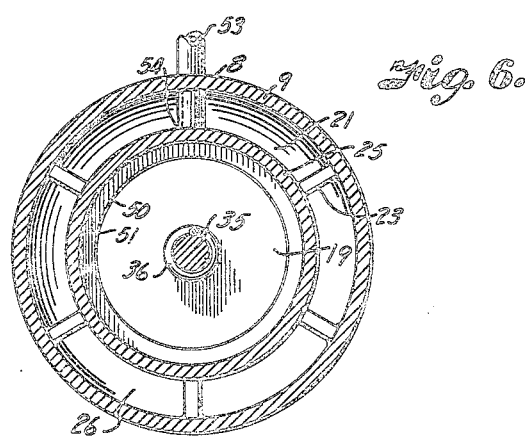

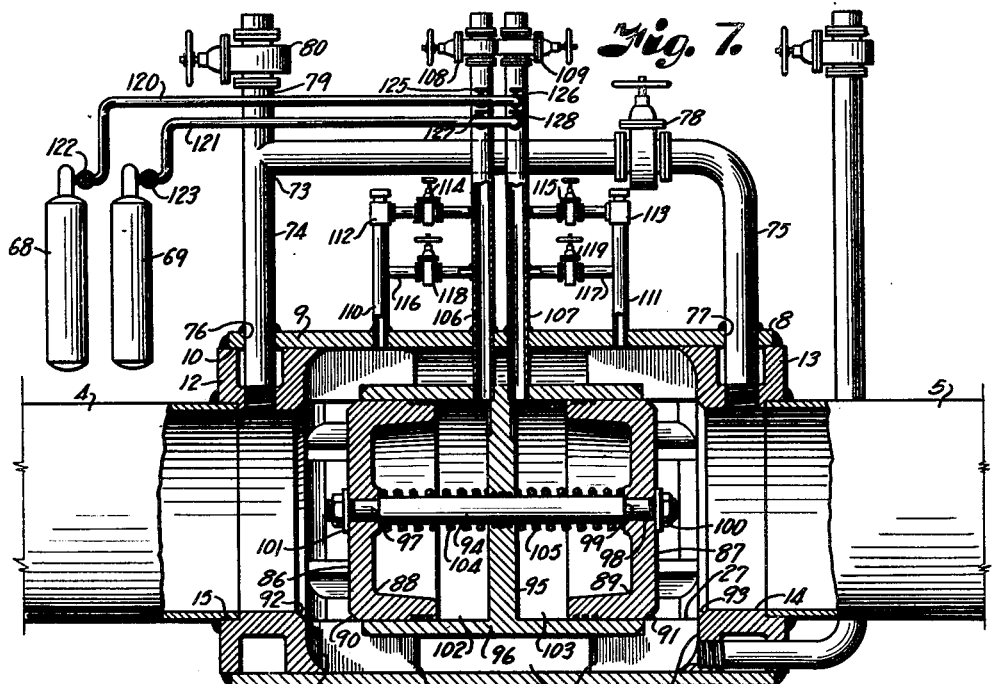

Patented Feb. 23, 1937

2,071,969

UNITED STATES PATENT OFFICE 2,071,969

COMBINATION STOP AND CHECK VALVE

Alfred J. Diescher, Winfield, Kans., assignor of one-half to M. L. R. Diescher, Winfield, Kans.

Application May 28, 1934, Serial No. 727,856

15 Claims. (Cl. 137—153)

This invention relates to a combination stop and check valve and more particularly to a valve of this character for controlling and regulating flow of fluids through pipe line systems such as are used in transporting oil, gas and similar fluids from a source of supply to a distant point of delivery.

As outlined in my co-pending application for patent on "Pipe line system for the transportation of natural gas", Serial No. 592,939, filed February 15, 1932, automatic double acting check valves are inserted in the pipe line at suitable intervals to function automatically in case of a line break for stopping flow through the break. In addition to the automatic valves, the line is provided with suitable stop valves in order that certain sections of the line or branch lines may be shut off when making repairs in the line as for example when replacing sections of pipe that have been corroded by attack of soil acids. This double valve equipment adds to the expense of installation and maintenance of pipe line systems and complicates the method of operation.

It is, therefore, the principal object of the present invention to provide an improved combination valve construction which serves the dual purpose of a stop or gate valve and a double acting check valve, thereby effecting a saving in pipe line construction as well as simplifying the pipe line system in its method of operation.

Other important objects of the present invention are to provide a simple method of manually operating the valves so that they may be readily opened against line pressure, to provide a valve housing constructed of pipe sections, and to provide a valve housing wherein the parts may be welded together to eliminate threaded or bolted connections in the promotion of safety.

In accomplishing these and other objects of the invention, I have provided improved details of structure, the preferred forms of which are illustrated in the accompanying drawings, wherein:

Fig. 1 is a diagrammatic plan view of a portion of a pipe line equipped with valves embodying the features of the present invention.

Fig. 2 is an enlarged sectional view through one of the valves illustrating the valve check members or pistons in neutral position between the respective valve seats, the position being that assumed during normal flow through the line.

Fig. 3 is a similar sectional view showing the check member on the inlet side of the valve engaging its seat to stop flow therethrough.

Fig. 4 is a similar sectional view showing the check member at the outlet side of the valve engaged with its seat to stop flow therethrough.

Fig. 5 is a similar view showing the check member at the outlet end of the valve being moved to open position for reestablishing flow through the valve.

Fig. 6 is a cross sectional view through the valve on the line 6—6, Fig. 2.

Fig. 7 is a vertical sectional view through a modified form of valve showing the valve check members in neutral position between their respective seats.

Fig. 8 is a similar section showing the check member at the outlet side of the valve engaged with its seat to stop flow therethrough.

Fig. 9 is a further modified form of the valve incorporated in the form of an L connection.

Referring more in detail to the drawings:

1 designates a pipe line through which fluid is transported from a source of supply to a distant point of delivery under pressure by means of compressor or pump stations 2 as the case may be and which are located at suitable intervals along the line. Located in the line between the compressor stations at suitably spaced points, for example every five miles more or less, are by-passes 3 having their ends 4 and 5 connected into the line on opposite sides of a gate valve 6 that is normally closed to divert the flow in the line through the by-passes. Located in each by-pass is a combination automatic stop and check valve 7 which embodies the features of the present invention.

The valves 7 are of identically the same construction and, therefore, only one of them will be described in detail, the numerals used in designating the parts of the valve applying to the corresponding parts of each of the other valves.

As illustrated in Fig. 2, a valve 7 includes a cylindrical housing 8 including a tubular wall portion 9 of larger diameter than the connecting pipe sections 4 and 5 of the pipe in which the valve is installed. The cylinder wall 9 is preferably formed of a section of pipe and is closed at the ends 10 and 11 by inset heads or rings 12 and 13 having a suitable outer diameter to snugly engage the inner periphery of the cylindrical wall and having axial openings 14 conforming to the inner diameter of the pipe sections 4 and 5, the openings 14 being counter-bored in the outer ends of the heads to form annular recesses 15 to accommodate the ends of the pipe sections 4 and 5. The inner side of the heads 12 and 13 are provided with bevelled annular seats 16 and 17 formed axially of the connecting pipe sections and which are adapted to be engaged by the check members 18 and 19 to close flow through the valve as hereinafter described. The outer peripheries of the inner faces of the heads 12 and 13 are filleted as at 20 so that the inner faces 21 thereof are extended on rounded curves into contiguity with the inner face of the wall 9.

Extending inwardly from the inner faces 21 of the respective heads are radially extending wings 22 and 23 having notched ends 24 to seat the ends of an inner check chamber or cylinder 25. The cylinder 25 is thereby supported in axial alignment with the valve seats, with the ends thereof in spaced relation to the inner faces 21 of the heads and the wall 9 to provide an annular flow channel 26 connecting the inlet and outlet sides of the valve whereby flow through the valve is directed around the inner cylinder and the check members 18 and 19.

The inner edges 27 of the wings 22 preferably align with the inner periphery of the cylinder 25 to cooperate therewith in supporting the outer ends of the check members as they are projected from the cylinder when engaging their seats, as later described.

The check member 18 at the inlet side of the valve is in the form of a piston including a head 28 having a bevelled annular edge 29 conforming to the shape of the seat 16 and an inwardly extending skirt 30 slidably engaging within the inner cylinder 25 to retain the check member in axial alignment when it is moved to and from its seat 16, as later described.

Extending outwardly from the head 28 in concentric relation therewith is an integral boss 31 cooperating with a similar boss 32 extending from the opposite side of the head to accommodate an axial bore 33 extending from the inner side of the check member and terminating in the boss 31 to form an abutment 34 for engaging the end of a piston rod 35 that is carried by the other check member 19. The bore 33 is of larger diameter than the rod 35 to accommodate a coil spring 36 that is sleeved over the rod and has one end engaging the abutment 34 and its other end against the head 37 of the check member 19, now to be described.

The check member 19 is also in the form of a piston and includes a skirt portion 38 positioned in the opposite end of the cylinder 25 in the same relation as the skirt 30 of the check member 18 and is provided with an annular bevelled edge 39 corresponding to the bevel of the seat 17.

The opposite side of the head 37 is provided with an axial threaded socket 40 for engaging a reduced threaded end 41 of the rod 35 to connect the rod therewith and support it in concentric alignment with the bore 33 in the check member 18. The check member 19 is normally yieldingly retained from engagement with its seat by means of a plunger 42 that is slidably mounted in a bearing 43 of the head 13, the bearing being carried by spider-like arms 44 positioned within the opening 14 therein previously described.

Sleeved on the plunger 42 is a coiled spring 45 having one end engaging the bearing 43 and its other end engaging a head 46 on the plunger which in turn engages the head 37 of the check member 19 to retain the check member in retracted position within the cylinder 25, the movement of the plunger 42 being limited by a stop washer 47 secured on the opposite end of the plunger by lock nuts 48 that are threaded on a reduced end 49 thereof, as shown in Fig. 2.

When the check members are in neutral position as shown in Fig. 2, the stop washer 47 engages against the bearing 43 to normally limit movement of the check member 19 away from its seat under influence of the spring 45 and the spring 36 to retain the abutment 34 of the check member 18 in spaced relation to the end of the rod 35 whereby the check member 18 has initial independent movement relatively to the check 19, the purpose of which will become apparent in the description of the operation of the valve later described.

The inward movements of the checks 18 and 19 are limited by an inwardly extending annular rib 50 formed midway between the ends of the inner cylinder to provide stop shoulders 51 and 52 adapted to be engaged by the skirt 30 of the check 18 and the head 37 of the check 19 respectively.

The tension of the springs 36 and 45 is such as to cooperate with the resistance of the pistons to counter-balance the force of the normal flow through the valve so that the check members are retained stationary in the valve cylinder; however, in case of sudden rush of fluid through the line against the check 18, the momentum of the flow will overcome the resistance to effect movement of the check members in the direction of the outlet side of the valve and effect engagement of the check 19 with its seat 17 to stop the flow through the outlet opening 14, forward movement of the check 18 being stopped by the annular shoulder 51 to retain the checks in spaced relation, as shown in Fig. 4.

In order to reestablish flow through the line, it is desirable to establish equal pressures at opposite sides of the valve so that the pressure will act equally against the check members, but due to the difference in effective areas on the respective pistons, it is necessary to provide means for establishing differential pressures in the cylinder 25 and the outer sides of the check members.

This is accomplished by venting the cylinder 25 through a conduit 53 having its end 54 welded in an opening 55 that is formed intermediately of the ends of the cylinder as shown in Fig. 2 and projecting through an aligning opening 56 in the outer cylinder wall 9, the conduit 53 being welded in the opening 56, as at 57.

The outer end of the conduit extends a substantial distance above the valve and carries a gate valve 58 controlling flow to atmosphere. Connected into the conduit 53 are branch conduits 59 and 60 having their opposite ends welded into openings 61 and 62 formed in the cylinder wall 19 whereby fluid pressure within the valve housing may be established within the inner cylinder 25 upon opening of valves 63 and 64 in the respective branches.

The branch 59 besides being equipped with a valve 63 carries a check valve 65 that opens in the direction of the conduit 53 to prevent counter-flow from the conduit 53 into the interior of the valve when the valve 63 is opened and the valve 64 is closed. Also connected into the conduit 53 is a supply pipe 66 that is connected through a manifold 67 with pressure and vacuum containers 68 and 69 respectively, the manifold 67 being equipped with shut-off valves 70 and 71 so that communication may be selectively controlled with either one or the other of the containers 68 and 69. The pipe 66 may also be provided adjacent the conduit 53 with a gate valve 72.

In order to assist in reestablishing equalized pressures at opposite ends of the valve, the valve is provided with a by-pass 73 having legs 74 and 75 extending through openings 76 and 77 in the cylinder wall 9 and connected with the heads 12 and 13 whereby fluid from the pipe section 4 may be diverted through the by-pass to establish pressure in the pipe section 5 when the gate valve 78 is opened in the by-pass. The by-pass is further provided with a vent connection 79 formed as a continuation of the legs 74 and which is normally closed by a gate valve 80.

To assist in unseating the check 19, the by-pass valve 78 is opened and the valves 63 and 64 closed, after which the valve 58 is opened to allow air or fluid medium which has accumulated in the interior of the cylinder to be vented to atmosphere through the conduit 53. As soon as the pressure within the cylinder drops below the pressure in the outlet side of the valve, the check 19 will move to open position and thereby reestablish flow through the valve. Initially, the valve will open only to that extent at which the end of the rod 35 engages the abutment 34 on the check 18; however, as the pressures become more nearly equalized, the spring 45 comes into play to return the check member to neutral position, as shown in Fig. 2.

If it is desired to hasten opening of the valve from the position shown in Fig. 4, the valve 58 is closed, after the interior of the cylinder 25 has been vented to atmosphere and the valves 71 and 72 opened to produce a vacuum between the check members from the vacuum container, thereby creating greater differential pressures on opposite sides of the check 19 to hasten the opening.

After the check 19 has moved to open position, and to the point at which the rod 35 engages the abutment 34 on the check 18, the valves 71 and 72 are closed and the valve 63 opened to reestablish pipe line pressure within the cylinder 25 so that the spring 36 can return the check 18 to neutral position as shown in Fig. 2 and permit complete opening of the check 19.

Should the pipe line break on the inlet side of the valve, there will be a sudden rush or surge of fluid in reverse direction in the valve effecting escape through the opening. This sudden surge acting against the check 19 will move the checks in reverse direction until the check 18 seats on the inlet seat 16 to stop flow through the broken portion of the line to conserve the fluid in the outlet side of the valve.

After the break has been repaired and flow reestablished in the pipe, Fig. 3, the fluid pressure generated by the compressor stations 2 acting against the head 28 of the check 18 will effect unseating of the check member, particularly if the stations toward the delivery end of the line have continued to draw fluid from the section 5 which will of course cause drop of pressure on the outlet side of the valve and assist the higher pressure on the inlet side in reestablishing the flow. If desired, the flow may be immediately reestablished by opening the valve 58 to vent the cylinder 25 to atmosphere, thereby creating a substantial pressure differential at the opposite sides of the check 18 to effect its opening.

When it becomes necessary to shut off flow through the line, as when repairing a section of pipe, pressure is admitted to the cylinder 25 at a higher value than the normal pipe line pressure.

This is accomplished by opening the valves 70 and 72 to allow the high pressure from the container 68 to pass through the conduit 53 to the cylinder to force the pistons apart and into seating engagement with their respective seats which pressure is retained within the cylinder by the check 65 and by the closed valve 64. After the repair has been made, the checks are opened by venting the cylinders 25 upon opening the gate 58. If it is desired to save the gas in the cylinder, the gate 58 may be left closed and the valve 64 opened to allow the pressure in the cylinder 25 to bleed through the branch 60 into the interior of the valve housing.

If the pressures on the opposite sides of the valve are low, the checks may be opened by venting the cylinder 25 through the conduit 53 upon closing the valve 58 and opening the valves 71 and 72 to create a vacuum in the cylinder 25 which allows the valves to open in response to atmospheric pressures in the sections 4 and 5 of the line.

When the valves are suddenly closed, a substantial burden is placed upon the line and stations and this is relieved by equipping each station with by-pass connections 81 and 82 leading to a relief tank 83 wherethrough the fluid pumped by the station is circulated so that the pressure in the line is not built up to a dangerous point, the circulation of the excess fluid being controlled by suitable check valves 84 and 85 in the branches 81 and 82 respectively.

In the form of valve shown in Fig. 7, the check members 86 and 87 include reversely arranged pistons 88 and 89 having bevelled annular seats 90 and 91 for engaging the inlet and outlet seats 92 and 93 of the valve, respectively. The pistons are interconnected by a rod 94 that is slidably mounted through a bearing opening in a diaphragm 95 that is provided centrally of the inner cylinder 96. The opposite ends of the rod are provided with reduced extensions 97 extending through openings 98 in the heads of the pistons and forming shoulders 99 engaging the inner sides of the heads and which are retained thereagainst by nuts 100 threaded on the projecting ends of the rod extensions for clamping washers 101 against the outer face of the piston heads.

It is thus apparent that the inner cylinder is divided to form two interior chambers 102 and 103 and the pistons are normally retained at the outer ends of the chambers 102 and 103 in equally spaced relation to the diaphragm 95 by springs 104 and 105 having ends engaging against the diaphragm 95 and their opposite ends against the pistons 88 and 89, respectively.

The chambers 102 and 103 are vented to atmosphere through conduits 106 and 107 respectively, similar to the conduit 53 previously described, the outlets of the conduits 106 and 107 being controlled by valves 108 and 109.

The conduits 105 and 107 are connected to the interior of the housing by branch conduits 110 and 111 having checks 112 and 113 respectively wherethrough pressure within the valve housing may be supplied to either of the cylinder chambers 102 and 103. The conduits 110 and 111 are also provided with shut-off valves 114 and 115 to close flow through the checks 112 and 113 respectively. Also connecting the conduits 110 and 111 with the respective conduits 106 and 107 are branches 116 and 117 having valves 118 and 119. The conduits 106 and 107 are connected to the pressure and vacuum vessels 68 and 69 respectively through conduits 120 and 121, the conduits 120 and 121 being provided adjacent the respective containers with shut-off valves 122 and 123 and adjacent their points of connection with the conduits 106 and 107 with valves 125 and 126, 127 and 128. Otherwise the valve is constructed in exactly the same manner as the valve in the preferred form previously described.

When sudden surge of fluid flows from the inlet side of the valve toward the outlet side, the checks will move together until the check 87 engages its seat on the outlet side of the valve compressing the spring 104 and allowing the spring 105 to expand as shown in Fig. 8.

To reestablish opening of the check member 87 the vacuum may be drawn in the chamber 103 by opening the valves 123 and 128 to establish communication with the vacuum container.

The valves 122 and 125 are then opened to establish communication with the pressure cylinder 68 and the chamber 102 whereby pressure is admitted to the chamber 100 to cooperate with the atmospheric pressure or vacuum as the case may be in establishing pressure differential on opposite sides of the check member 87 to effect immediate opening thereof for the resumption of flow through the valve. If desired, the by-pass valve 78 may be opened prior to the establishing of pressure differentials within the chambers 102 and 103.

When the check member 86 seats against the inlet seat, the valve can be reopened by building up the pressure in the line 4 or by creating a vacuum in the chamber 102 and establishing pressure in the chamber 103 to start flow through the valve. Either one of the check members may be engaged with its seat by opening communication with the pressure cylinder 68 and the chamber in which the check member is mounted. For example, if the check member 86 is to be engaged with its seat 92, the valve 125 is opened to allow pressure to enter the chamber 102 to force the check member against its seat in opposition to the pressure of the fluid moving through the valve.

The check member 87 may be moved into engagement with its seat in a similar manner.

To reestablish flow through the valve, the pressure may be allowed to escape by opening one of the other vent valves 118 and 119 depending upon which of the checks is seated, after which pressure may be applied to the other chamber to effect opening of the check. To assist the pressure, a vacuum may also be drawn in the cylinder containing the check being opened.

In Fig. 9, the valve housing includes an L shaped pipe 130 and the inner check cylinder 131 is of similar shape and supported therein by the heads 132 and 133 in substantially the same manner as the form of invention illustrated in Fig. 2. The check pistons 134 and 135 are slidably mounted in the ends of the inner member 131 and are normally retained in open position relatively to their seats by rods 136 and 137 threaded into the respective pistons and slidable in bearing spiders 138 and 139. The rods extend through the bearing spiders and carry coiled springs 140 and 141 sleeved thereon and having their ends bearing against their respective spiders and against fixed washers 142 at the outer ends of the rods. The springs thus normally tend to move the check members toward their seats, but the piston check member 135 is arrested by flow of fluid through the line and the check member 134 by a spring 143 coiled on the rod 136 and having its ends engaging against the piston and spider 139 respectively.

To seat the check pistons 134 and 135, pressure is admitted to the inner member 131 through a conduit 144 to cause engagement of both checks with their seats compressing the springs 143 and moving the rods through the bearing spiders. Under normal conditions, line pressure is carried between the pistons through branch conduits 145 and 146 connecting the interior of the valve housing with the conduit 144, the branches 145 and 146 being equipped with suitable check and control valves similar to the branches in the preferred form of valves.

When the surge of current flows through the valve in one direction, movement of the check piston at that end of the valve will cause similar closing movement of the check piston at the opposite end of the valve and vice versa through the fluid trapped therebetween.

To open the closed check piston, the pressure between the pistons is exhausted through the conduit 144 and a vacuum may be drawn therein to effect movement of the closed check, thereby establishing flow through the valve. After the flow has been established, the vacuum is turned off and the line pressure is allowed to enter between pistons and return them to their neutral position aided by the springs 140 and 143 in case the check piston 134 has seated, or the line pressure and spring 141 if the check piston was the one seated.

An important feature in the general operation of the valves is that while the valves close under abnormal surge through the line, the check members may be so designed as to weight and spring resistance that they will not close on a small line break, such as a slit in the pipe, for in such instances it is often desirable to continue the flow to market and make the repair by placing a split sleeve over the injured portion of the pipe, in which case the checks are not closed. The distinction between a small break and a large break can be decided at the time of inserting the check valve in the line and the weight of the check member and spring resistance is proportioned to require a material surge before the check members close.

In valves of the character described, it would be impossible to pass a pipe cleaning device known as a "go-devil" through the line if the valves were directly connected therein, but by using the by-passes and locating the check valves in the by-passes, a go-devil may be used in the line and passed through the gate 6 when the gates are opened as in conventional practice, the go-devil being illustrated at 147, Fig. 1.

From the foregoing it is apparent that I have provided a combination double acting check and stop valve which automatically closes under abnormal line flow and which may be readily opened when normal flow is established.

It is also apparent that the checks may be readily closed by applying pressure therebetween to force the checks into engagement with their respective seats when it is necessary to disconnect portions of the line between the respective checks.

Also, due to the welded construction of the valve housings, the connections adequately retain the high pressures which may be carried in the line to promote safety factors of the valve.

Also due to the fact that pipe sections may be employed in constructing the valve housing, the valves are of relatively light weight and are entirely free from blow holes and other defects incidental to cast construction.

What I claim and desire to secure by Letters Patent is:

1. A valve of the character described including a housing having an outlet seat, a cylinder, means supporting the cylinder in the housing in concentric alignment with said seat, a check member slidably mounted in the cylinder and adapted to engage said seat, means connected with the cylinder for injecting a pressure medium to move the check member to seat engaging position to close flow through the valve, means for exhausting said pressure medium to effect unseating of said check member, and means for creating a vacuum in said cylinder to promote substantially immediate unseating of the check member.

2. A valve of the character described including a housing having oppositely facing inlet and outlet seats, a cylinder, means supporting the cylinder in the housing in concentric alignment with said seats, piston check members slidably mounted in the cylinder and adapted to engage said seats, means connected with the cylinder for injecting a pressure medium to move the check members to seat engaging position to close flow through the valve, means for exhausting said pressure medium to effect unseating said check members, and means for creating a vacuum in said cylinder to promote substantially immediate unseating of the check members.

3. A valve of the character described including a housing having oppositely facing inlet and outlet seats, a cylinder, means supporting the cylinder in the housing in concentric alignment with said seats, check members slidably mounted in the cylinder and adapted to engage said seats, means interengaging one check member with the other whereby abnormal surge acting against one check member seats the other, means connected with the cylinder for injecting a pressure medium to move the check members to seat engaging position for selectively closing flow through the valve, means for exhausting said pressure medium to effect unseating said check members, and a by-pass connected with opposite sides of the valve housing on the exterior sides of said seats to effect substantial equalization of pressure at opposite ends of the valve.

4. A valve of the character described including a housing having a check seat, a cylinder supported in the housing, a check member slidable in the cylinder to engage said seat in response to sudden surge of fluid through the valve, means for injecting a pressure medium into the cylinder to selectively move the check member to seated position independently of said surge, and means for establishing a vacuum pressure in the cylinder to open said check member.

5. A valve of the character described including a housing having a check seat, a cylinder supported in the housing, a check member slidable in the cylinder to engage said seat in response to sudden surge of fluid through the valve, a spring in the housing and engaging the check member to normally retain the check member in unseated position, means for injecting a pressure medium into the cylinder to selectively move the check member to seated position independently of said surge, and means for establishing a vacuum pressure in the cylinder to open said check member.

6. In a flow line, a valve including a housing having oppositely facing seats, a cylinder supported in the housing between said seats, check members slidably supported in opposite ends of the cylinder and adapted to engage said seats, means yieldingly retaining the check members from seating under normal flow conditions through the valve, means interengaging the check members to effect movement of the check members under abnormal flow through the valve to seat one of said check members, and means normally maintaining line pressure in the cylinder.

7. In a flow line, a valve including a housing having oppositely facing seats, a cylinder supported in the housing between said seats, check members slidably supported in opposite ends of the cylinder and adapted to engage said seats, means yieldingly retaining the check members from seating under normal flow conditions through the valve, means interengaging the check members to effect movement of the check members under abnormal flow through the valve to seat one of said check members, means normally maintaining line pressure in the cylinder, and means for exhausting pressure in the cylinder to open the seated check member.

8. In a flow line, a valve including a housing having oppositely facing seats, a cylinder supported in the housing between said seats, check members slidably supported in opposite ends of the cylinder and adapted to engage said seats, means yieldingly retaining the check members from seating under normal flow conditions through the valve, means interengaging the check members to effect movement of the check members under abnormal flow through the valve to seat one of said check members, means normally maintaining line pressure in the cylinder, and means connected with the cylinder for injecting a higher pressure medium to effect seating of the check member independent of abnormal flow through the valve.

9. In a flow line, a valve including a housing having oppositely facing seats, a cylinder supported in the housing having separate chambers facing said seats, check members slidably supported in said chambers and adapted to engage said seats, means yieldingly retaining the check members from seating under normal flow conditions through the valve, a rod having its ends fixed to the respective check members to effect simultaneous movement of the check members under abnormal flow through the valve to seat one of said check members, means for selectively injecting a high pressure medium in one chamber and exhausting pressure from the other chamber to effect seating of the check members independently of said abnormal flow.

10. In a flow line, a valve including a housing having oppositely facing seats, a cylinder supported in the housing between said seats, check members slidably supported in opposite ends of the cylinder and adapted to respectively engage said seats, means interengaging the check members to effect movement of the check members under abnormal flow through the valve to seat one of said check members, means connected with the cylinder to inject a pressure medium in the cylinder to effect movement of the check members in one direction, and means for exhausting the pressure medium from the cylinder into the valve housing to effect movement of the check members in the other direction.

11. A valve of the character described including a housing having an inlet port and an outlet port provided with check seats, a check cylinder in the housing, check members in the housing adapted to engage the respective seats and having an abutment on one of the check members, a rod carried by the other check member and normally spaced from said abutment when the check members are in normal open and seated positions and adapted to engage said abutment during initial opening movement of a seated check member to prevent chattering of the check member incidental to rush of fluid prior to neutralization of pressures.

12. A valve of the character described including a housing having inlet and outlet ports provided with check seats, a check cylinder in the housing and having a check stop, check members in the housing adapted to engage the respective seats and having an abutment in one of said check members, and a rod carried by the other check member and normally spaced from said abutment when the check members are in normally open positions and when one check is in seated position and the other is engaging said stop and adapted to engage said abutment during initial opening movement of the seated check incidental to rush of fluid prior to neutralization of pressures.

13. A valve of the character described including a housing having an inlet port and an outlet port provided with a check seat, a check member slidable in the housing, a second member slidable in the housing, means connecting said second member with the check member to seat said check member in response to sudden surge of fluid through the valve, and means connected with the housing and terminating exteriorly of said housing for exhausting pressure acting on the check member below the pressure on the seat side to effect unseating of said check member.

14. A valve of the character described including a housing having oppositely facing inlet and outlet ports provided with check seats, a pair of check members in the housing adapted to respectively engage said seats to close flow through the valve, means interconnecting the check members whereby abnormal surge acting against one check member seats the other, and means connected with the valve and terminating exteriorly of the valve for exhausting pressure acting between said check members below the pressure on the seat sides to unseat said members.

15. A valve of the character described including a housing having oppositely facing inlet and outlet ports provided with check seats, a check chamber in the housing, a pair of check members in the check chamber adapted to respectively engage said seats to close flow through the valve, fluid pressure means for injecting pressure into the check chamber to simultaneously act against said check members to close flow through the valve, and means for exhausting fluid pressure from said check chamber to effect simultaneous unseating of said members.

ALFRED J. DIESCHER.